United States Patent [19]

Smoak et al.

[11] 3,862,846

[45] Jan. 28, 1975

[54] PROCESS FOR PREPARING CERAMIC COMPOSITIONS

[75] Inventors: Richard H. Smoak, Bethlehem, Pa.; Ronald Staut, Cherry Hill, N.J.; John F. Burst, Wayne, Pa.

[73] Assignee: General Refractories Company, Philadelphia, Pa.

[22] Filed: Jan. 14, 1972

[21] Appl. No.: 218,007

Related U.S. Application Data

[63] Continuation-in-part of Ser. No. 844,628, July 24, 1969, abandoned.

[52] U.S. Cl.............. 106/73.1, 106/62, 106/65, 106/73.3, 106/73.4, 264/332
[51] Int. Cl............................................. C04b 35/60
[58] Field of Search ....... 264/65, 332; 106/65, 73.1, 106/73.3, 73.4, 62

[56] References Cited
UNITED STATES PATENTS 3,379,523  4/1968  Das Chaklader .................. 264/332
3,702,881  11/1972  Das Chaklader .................. 264/332

OTHER PUBLICATIONS

Morgan & Scala, "The Formation of Fully Dense Oxides by Pressure Calcintering of Hydroxides, 38 1967, Sintering & Related Phenomena, G. C. Kucznski (Ed.), Gordon and Breach, pp 861–894.

*Primary Examiner*—Donald J. Arnold
*Assistant Examiner*—J. R. Hall
*Attorney, Agent, or Firm*—Finnegan, Henderson, Farabow & Garrett

[57] ABSTRACT

A process for preparing high density ceramic products of alumina and magnesia from an admixture comprising a dopant and a decomposable ceramic-forming compound which decomposes to alumina and magnesia. Densification of these ceramic products is achieved at reduced temperatures and pressures, thus, making possible the implantation of low melting point metals in such ceramic products.

26 Claims, No Drawings

PROCESS FOR PREPARING CERAMIC COMPOSITIONS

This application is a continuation-in-part of our earlier filed copending application Ser. No. 844,628 filed July 24, 1969, and titled "Ceramic Compositions" and now abandoned.

This invention relates to a process for preparing formed, that is, shaped high density ceramic products of the solid oxides alumina ($Al_2O_3$) and magnesia (MgO). Further, this invention relates to a method for preparing such shaped high density ceramic products containing metal implants. For the purposes hereof, the term "high density" shall refer to a bulk density of the ceramic phase in excess of 90 percent of its theoretical density and preferably in excess of 95 percent of its theoretical density.

The preparation of formed ceramic products, as such, is well known in the art. In the past, ceramic products were generally densified and shaped by first subjecting an oxide-containing ceramic material to a forming operation, such as dry or isostatic pressing, slip casting, extrusion and the like. The shaped material was then sintered at relatively high temperatures, usually well above 1,000°C, to increase its density so as to result in a ceramic product possessing strength and hardness. A somewhat similar prior art technique for preparing such ceramics is referred to as a thermo-mechanical or hot pressing process. This method involves sintering under pressures, that is, hot forging, hot rolling, ordinary pressure calcintering and the like.

Due to the nature of these processes, there are severe limitations imposed upon their usefulness. For example, complete sintering may necessitate anywhere from several hours to several days at temperatures in the range of 1400°C or even higher. Thus, these processes not only consume inordinately large amounts of time, but they are also expensive because of the high level of thermal energy utilized. Nevertheless, of even greater significance is the fact that because of this necessity to employ high temperatures, it is not feasible to implant all but a few metals in the ceramic matrix. Specifically, the great majority of metals that could be utilized for implanting in ceramic products would be seriously degraded since their melting point would be exceeded during sintering. It is important when incorporating metal in ceramic matrixes to avoid melting the metal and oxidizing it because otherwise the metal will run out and go into solution. For this reason, the prior art processes ordinarily require the use of highly refractory metals such as tungsten (melting point - 3,370°C), tantalum (melting point - 2,990°C), platinum (melting point - 1,773°C) and others which are not only expensive but may also lack the desired physical properties in certain applications.

The prior art has also formed ceramic products by subjecting a material which decomposes to an oxide to its decomposition temperature and while the decomposition is occurring applying pressure to the material to shape, strengthen and densify it. Although this process is carried out at temperatures below the sintering temperatures normally used to produce ceramic products from oxide containing products, it has not always been possible with this method to obtain decomposition products having as high a density as that obtained by sintering shaped oxide containing products. Thus, it has not been possible to obtain alumina products having a density greater than 86 percent of its theoretical density by decomposing a material which forms alumina. Further, although ceramic products produced by this method have had metal powders incorporated therein, the density of the ceramic phase of such products has not been high. It is important to obtain a high density in the ceramic phase of ceramic-metal composites because the strength of the composite article is thereby increased. Further, a better interaction between the ceramic and metal is obtained thereby transferring the ductile properties of the metal to the ceramic while retaining the hardness and compressive strength of the ceramic.

Accordingly, a means whereby metals with lower melting points can be implanted in ceramic matrixes of alumina and magnesia having a high density greater than 90 percent of its theoretical density and preferably greater than 95 percent of its theoretical density while substantially maintaining the physical properties of the metals intact would constitute a significant advance in the art. The present invention provides such a means.

Specifically, the present invention provides a process for preparing high density shaped ceramic products of alumina and magnesia having a high density greater than 90 percent of its theoretical density, and preferably greater than 95 percent of its theoretical density at temperatures and pressures substantially lower than those employed in the prior art. As a consequence thereof, for the first time various lower melting point metals can be implanted in high density ceramic matrixes of alumina and magnesia without deleteriously affecting the physical characteristics of the metal. Furthermore, the present invention constitutes an economical means for the preparation of shaped ceramic products since less heat and pressure than is normally required to produce high density ceramic matrixes of alumina and magnesia will be necessitated. In addition, this invention makes it possible to utilize lower cost equipment for the production of ceramic products. For example, metal alloy rather than graphite die sets can be employed. Metal alloy die sets are easier to machine and of course, substantially less costly than graphite dies. Of course, numerous additional advantages will become apparent upon further consideration of the following specification and claims.

In essence, the present invention provides a process for preparing formed high density alumina and magnesia products having a continuous ceramic matrix of a density greater than 86 percent of its theoretical density which as embodied and broadly described, comprises admixing at least one decomposable ceramic-forming compound which on heating to a temperature between about 300°C and about 1,200°C decomposes to yield at least one oxide selected from the group consisting of alumina and magnesia, about 0.01 to 15 percent of at least one dopant selected from the group consisting of fluorine containing compounds and metal oxides and about 0 to 39.99 percent of non-decomposable filler material; heating the admixture to the decomposition temperature of between about 300°C and about 1,200°C of the decomposable ceramic forming compound and applying pressure to the admixture while the decomposition is occurring, the application of pressure simultaneously with the heat initiated decomposition resulting in the shaping, strengthening and densifying of the admixture.

In accordance with a preferred embodiment of the invention, ceramic-metallic composites are provided having a continuous ceramic matrix of at least 50 volume percent of the composite of at least one material selected from the group consisting of alumina and magnesia having a density of at least 95 percent of its theoretical density and a metallic phase comprising less than 50 volume percent of the composite. The ceramic-metallic composites are prepared by implanting a metallic phase into an admixture consisting essentially of, by weight, about 60 to 99.99 percent of at least one decomposable ceramic forming compound which decomposes on heating to a temperature of between about 300°C and about 1,200°C to yield at least one oxide selected from the group consisting of alumina and magnesia, about 0.01 to 15 percent of at least one dopant selected from the group consisting of fluorine containing compounds and metal oxides and about 0 to 39.99 percent of non-decomposable filler materials; heating the metallic phase containing admixture to the decomposition temperature of the decomposable ceramic forming compound; and applying pressure to the metallic phase containing admixture while the decomposition is occurring. The application of pressure simultaneously with the heat initiated decomposition results in the shaping, strengthening and densifying of the metallic phase containing admixture to produce a high density ceramic product while maintaining essentially all of the physical characteristics of the metallic phase intact.

In accordance with the invention, decomposable ceramic-forming compounds within the scope of this invention on heating to a temperature in the range of about 300°C to about 1,200°C decompose to produce an oxide or oxides. Typically, these decomposable ceramic-forming compounds will be carbonates, bicarbonates, hydroxides, nitrates, sulfates and chromates of aluminum, beryllium, chromium, iron, magnesium, nickel, thorium, titanium, uranium, and the like. The hydroxides of aluminum and magnesium are especially useful for the purposes of this invention.

As indicated, the decomposable ceramic-forming compound is admixed with a dopant. By the term "dopant" is meant an element(s) and/or major compound(s) which when admixed with a decomposable ceramic-forming compound having no more than 1 percent impurities will constitute no more than 15 percent by weight of the total of the admixture and will reduce by at least 10 percent the minimum temperature necessary to achieve 95 percent of the theoretical density for the ceramic matrix comprised of alumina and magnesia that is formed by the decomposable ceramic-forming compound. The minimum temperature necessary for 95 percent densification is the lowest temperature at which the alumina and magnesia formed by the decomposable ceramic-forming compound will be densified to the extent of 95 percent of its theoretical density without the presence of admixed element(s) and/or compound(s). Of course, the temperature required to reach any level of densification is also dependent upon the pressure exerted upon the decomposable ceramic-forming compound during heating. Thus, in determing whether any element(s) and/or compound(s) are dopants within the gamut of this invention for any particular decomposable ceramic-forming compound, it is imperative that densification thereof with and without the admixed components be conducted at the same pressure. Such dopants will be selected from the group consisting of fluorine containing compounds, or metal oxides. Some typical dopants would include LiF, $MgF_2$, HF, $AlF_3$, $CrF_3$, CoO, $CrO_3$, $Cr_2O_3$, CuO, $MO_3$, MnO, $Nb_2O_5$, NiO, $TiO_2$, $WO_3$, $Y_2O_3$, and $ZrO_2$. Lithium fluoride is a particularly effective dopant.

Where desired, two or more dopants may be combined. In fact, oftentimes better results are obtained with a combination of dopants. In any event, selecting the best dopant or combination of dopants for any given admixture is well within the skill of one knowledgeable in the art.

In addition to the decomposable ceramic-forming compounds and dopants, the admixture will often comprise minor amounts of non-metallic non-decomposable filler materials. The makeup and amount of non-decomposable filler materials incorporated in any admixture should be such that they will not deleteriously affect the characteristics of the ceramic products prepared therefrom. Carbon, calcined ceramic materials and silica are typical of the non-decomposable filler materials utilizable herewith.

Thus, an admixture suitable for preparing shaped high density ceramic products in accordance with this invention will consist essentially of, by weight, about 60 to 99.99 percent of at least one decomposable ceramic-forming compound, about 0.01 to 15 percent of at least one dopant and about 0 to 39.99 percent of non-decomposables. Preferably, such admixtures will consist essentially of, by weight, about 80 to 99.5 percent of at least one decomposable ceramic-forming compound, about 0.5 to 5 percent of at least one dopant and about 0 to 15 percent of non-decomposable filler materials.

As indicated heretofore, the shaped high density ceramic products of this invention can be formed directly from the admixture. Generally, this is done by pressing the admixture in matched metal or graphite dies. Upon the application of sufficient heat and pressure, extremely uniform high density ceramic products are obtained. Generally, this will necessitate a temperature of at least about 300°C and a pressure of at least about 100 pounds per square inch. Preferably, the temperature will be within a range of about 500° to 1,200°C and the pressure will be within a range of about 1,000 to 10,000 pounds per square inch. Of course, in practice, the actual temperature or temperature range employed will vary from admixture to admixture. It has been observed that the temperature or temperature range to be used will frequently depend on such factors as the thermal history, origin, impurity content, and grain size of the decomposable compound, dopant, and any non-decomposables present as the case may be. Similarly, the pressure employed will vary widely, there being theoretically no known upper limit. Of course, any practical means can be utilized to supply the required heat and pressure.

While it is preferred, for low cost manufacture, that the shaped high density ceramic products be hot pressed directly from the admixture, the use of this simplified processing is not essential to the practice of the present invention. For example, often the admixture will be ground and then pressed. Similarly, the admixture may have a binder incorporated therein before pressing. As is apparent, this process lends itself to numerous obvious variations, all of which are contemplated and within the scope of this invention.

By way of illustration, magnesium hydroxide was densified in accordance with the prior art (heat and pressure alone) and also in the manner of this invention (with the addition of a dopant, namely LiF). Both samples of the Mg(OH)$_2$, namely, the Mg(OH)$_2$ alone and the one with the LiF addition were subjected to a pressure of 10,000 pounds per square inch. Thereafter, the temperature required to reach 100 percent of theoretical density of the resulting MgO was observed. The Mg(OH)$_2$ charge without the dopant did such as 900°C. In sharp contrast, the Mg(OH)$_2$ and LiF admixture achieved 100 percent of theoretical density of MgO at 675°C. Thus, although it is possible to achieve a high density of MgO during decomposition of Mg(OH)$_2$, the use of a dopant with Mg(OH)$_2$ lowers the minimum temperature necessary to achieve this high density. Further, depending on the size and shape of the final product and other materials incorporated therein, it is not always possible to achieve a high uniform density of MgO during the decomposition due to such factors as poor heat transfer to the interior of the product, but the use of the dopants in accordance with the present invention enables the obtaining of high density MgO products during the decomposition.

When producing Al$_2$O$_3$ by decomposition, it has not been possible to obtain a high density during the decomposition, but by using a dopant in accordance with the present invention, high density alumina of greater than 95 percent can be obtained during the decomposition process. To obtain alumina products of greater than 95 percent theoretical density, the temperature of the decomposition process should be at the upper end of the 300°C to 1,200°C range, and preferably is about 1,200°C.

Thus, by means of the present invention, it is possible to prepare high density ceramics at temperatures substantially lower than those required for conventional sintering. The dopant increases the density of alumina ceramic phases to a density higher than that otherwise obtainable at the above composition temperature range of 300°C to 1,200°C and to at least 86 percent of the theoretical density of the ceramic phases and preferably 95 percent of the theoretical density. The dopant also increases the density of the MgO ceramic phases which would not otherwise form high density phases at the decomposition temperature range to a high density of at least 86 percent of its theoretical density and preferably to at least 95 percent theoretical density.

Accordingly, the present invention may be utilized for the economical and efficient preparation of ceramic products. However, of particular significance is the fact that it will now be possible to implant numerous metals in such ceramic products since the lower temperatures employable will be below the melting point of most metals desirable for that purpose. Such metal reinforced ceramic products may be referred to as ceramic-metallic composites.

Preparation of the ceramic-metallic composite comprises first the implanting of a metallic phase into an admixture consisting essentially of, by weight, about 60 to 99.99 percent of at least one decomposable ceramic-forming compound, about 0.01 to 15 percent of at least one dopant and about 0 to 39.99 percent of non-decomposables. Thereafter, the metallic phase containing admixture is subjected to heat and pressure in an amount which is effective to produce a shaped high density ceramic product while maintaining essentially all of the physical characteristics of the metallic phase intact.

The metallic phase is a metal which is capable of maintaining essentially all of its physical characteristics intact while being implanted in an admixture and by the manner noted heretofore. For the most part, the metallic phase can be in any size, shape or configuration. For example, the metallic phase may be in the form of a powder, or powders, whiskers, chips, granules, shavings, strips, sheets, wires, three-dimensional wire networks, honeycombs and the like. Preferably, the metallic phase comprises a continuous interconnected structure such as a continuous interconnected wire network as opposed to a completely dispersed metal powder phase, but nevertheless comprises less than 50 volume percent of the ceramic-metallic composite so that the ceramic phase is the continuous phase of the composite. Use of an interconnected metal phase aids in distributing heat to the interior of the ceramic-metallic composite during the forming process and contributes to the forming of a ceramic matrix having a more uniform density throughout. Some typical metals utilizable in this invention would include copper, iron, nickel, titanium, steels, nickel and chrome alloys and the like. Thus, by means of this invention it will be possible to prepare ceramic tool tips, bearings, transparent sight parts, turbine blades, armor and the like.

The process of the present invention produces ceramic-metallic composites in which the continuous alumina or magnesia ceramic phase of the composite has a density greater than 95 percent of its theoretical density. The density of the ceramic phase is a bulk density determined by neglecting the metal phase. The theoretical density used in the determination is 3.98 for alumina and 3.58 for magnesia.

The many facets of this invention are further illustrated by the following examples which are not to be construed as limitations thereof. On the contrary, resort may be had to various other embodiments, modifications and equivalents of these examples which readily suggest themselves to those skilled in the art without departing from the spirit of the present invention and/or scope of the appended claims.

EXAMPLE I

In accordance with the process of this invention, a series of admixtures comprising high purity commercially available Al(OH)$_3$ or Mg(OH)$_2$ were densified under varying temperatures and pressures. Table I hereinafter sets forth depicts the materials and conditions employed along with the results (density) obtained.

TABLE I

| ADMIXTURE | | | | |
|---|---|---|---|---|
| Decomposable Compound | Dopant | Temp. C° | Pressure psi | Final density (% of theoretical) |
| Al(OH)$_3$ | 0.25 Wt. % LiF. | 1210 | 3000 | 97% |
| Al(OH)$_3$ | 2.0 Wt. % TiO$_2$; 3.63 Wt. % HF. | 1210 | 3000 | 98% |
| Al(OH)$_3$ | 0.06 Wt. % MgF$_2$. | 1140 | 3000 | 86% |
| Mg(OH)$_2$ | 1.0 Wt. % | 860 | 3000 | 95.5% |

TABLE I-Continued

| ADMIXTURE | | | | |
|---|---|---|---|---|
| Decomposable Compound | Dopant | Temp. C° | Pressure psi | Final density (% of theoretical) |
| $Mg(OH)_2$ | 0.5 Wt. % LiF. | 1100 | 4000 | 97.8% |
| $Mg(OH)_2$ | 1.0 Wt. % LiF. | 960 | 3000 | 97.0% |

EXAMPLE II

Commercially available alpha alumina trihydrate was blended with various dopants. The admixture was then placed in a graphite mold and heated under pressure to 1,200°C. The assembly was subsequently cooled to a temperature at which the shaped ceramic article could be removed. Table II shows the data so obtained.

TABLE II

| ADMIXTURE | | Formed Density (% Theor.) |
|---|---|---|
| Decomposable Compound | Dopant | |
| $Al(OH)_3$ | — | 56.6% |
| $Al(OH)_3$ | 5.24 Wt. % $TiO_2$ | 98.8% |
| $Al(OH)_3$ | 7.94 Wt. % $TiO_2$ | 99.6% |
| $Al(OH)_3$ | 1.21 Wt. % $TiO_2$ 1.22 Wt. % MnO 1.84 Wt. % FeO | 98.4% |
| $Al(OH)_3$ | 2.59 Wt. % $TiO_2$ | 94.6% |

EXAMPLE III

In a manner similar to that of Example II, $Al(OH)_3$ and $Mg(OH)_2$ were separately blended with various dopants and placed in a graphite mold. To these admixtures, there was then implanted metals of various configurations. The metal containing admixture was then subjected to heat and pressure until the ceramic matrix was densified. Table III sets forth the specific components of each admixture along with the density of the resulting ceramic matrix.

Examination of the implanted metallic phase in the above ceramic-metal composite showed that each remained intact and also maintained its physical characteristics.

The invention in its broader aspects is not limited to the specific details shown and described and departures may be made from such details without departing from the principles of the invention and without sacrificing its chief advantages.

What is claimed is:

1. A process for shaping and densifying an alumina ceramic product having a continuous ceramic matrix and a density greater than 3.42 comprising:
   a. mixing, by weight, (i) about 60 to 99.99 percent of a decomposable ceramic-forming compound which on heating to a temperature of about 300°C - 1,200°C decomposes to alumina; (ii) about 0.01 to 15 percent of at least one dopant selected from the group consisting of fluorine-containing inorganic compounds and metal oxides and (iii) about 0 - 39.99 percent of a non-metallic filler material which is non-decomposable at 300°C - 1,200°C;
   b. heating the mixture to about 300°C - 1,200°C to decompose said ceramic-forming compound; and
   c. pressing said mixture while said ceramic-forming compound is decomposing to shape, strengthen and densify said mixture and produce a product that when cooled has a continuous ceramic matrix, and a density greater than 3.42.

2. The process of claim 1 in which by weight, about 80 to 99.5 percent decomposable ceramic-forming compound, about 0.5 to 5 percent of dopant and about 0 to 15 percent of non-decomposables are mixed in step (a).

3. The process of claim 1 in which the mixture is subjected to a pressure of at least about 100 pounds per square inch during the step of pressing said mixture while said ceramic-forming compound is decomposing.

4. The process of claim 1 in which during the step of heating the mixture to decompose said ceramic-forming compound the mixture is subjected to a temperature in the range of about 500° to 1,100°C, and during the step of pressing said mixture, the mixture is subjected to a pressure in the range of about 1,000 to 10,000 pounds per square inch.

5. The process of claim 1 in which said decomposable ceramic-forming compound is aluminum hydroxide.

6. The process of claim 1 in which said dopant is a fluorine-containing inorganic compound.

TABLE III

| ADMIXTURE | | Type Metal | Temp. C° | Ceramic Matrix Density (% Theor.) |
|---|---|---|---|---|
| Decomposable Compound | Dopant | | | |
| $Al(OH)_3$ | 0.25 Wt. % LiF. | Ti Wire | 1200 | 99.1% |
| $Al(OH)_3$ | 0.25 Wt. % LiF. | Ti Wire | 1200 | 98.7% |
| $Mg(OH)_2$ | 1.0 Wt. % LiF 2.0 Wt. % CaO 0.5 Wt. % $SiO_2$ | Nichrome Wire | 960 | 98.4% |
| $Mg(OH)_2$ | 1.0 Wt. % LiF 2.0 Wt. % CaO 0.5 Wt. % $SiO_2$ | Steel Honeycomb | 910 | 98.6% |

7. The process of claim 6 wherein said fluorine-containing compound is selected from the group consisting of LiF, $MgF_2$, HF, $AlF_3$ and $CrF_3$.

8. The process of claim 1 wherein the dopant is a metal oxide selected from the group consisting of CoO, $CrO_3$, $Cr_2O_3$, CuO, $MO_3$, MnO, $Nb_2O_5$, NiO, $TiO_2$, $WO_3$, $Y_2O_3$, and $ZrO_2$.

9. The process of claim 1 wherein said mixture is heated to a temperature of about 1,200°C while pressing to form a product having a density greater than 3.78.

10. A process for the preparation of a ceramic-metal composite including (1) a continuous ceramic matrix of alumina, of at least 50 percent by volume of the composite, and (2) a metal comprising less than 50 volume percent of the composite, comprising:
  a. implanting 50 parts by volume of a metal into more than 50 parts by volume of a mixture consisting essentially of, by weight, (i) about 60 to 99.99 percent of at least one ceramic-forming compound which decomposes at 300°C – 1,200°C to yield alumina, (ii) about 0.01 to 15 percent of at least one dopant selected from the group consisting of fluorine-containing inorganic compounds and metal oxides and (iii) about 0 to 39.99 percent of non-metallic material that is non-decomposable at 300°C – 1,200°C;
  b. heating said mixture to about 300°C – 1,200°C to decompose said ceramic-forming compound, said metal having a melting point above the temperature in the range of 300°C – 1,200°C to which said mixture is heated in step (b) to decompose said ceramic-forming compound;
  c. pressing said mixture during said heating to shape, strengthen and densify said mixture to produce a ceramic-metallic composite having a continuous ceramic matrix and a density greater than 3.42 after cooling.

11. The process of claim 10 in which by weight, about 80 to 99.5 percent of decomposable ceramic-forming compound, about 0.5 to 5 percent of dopant, and about 0 to 15 percent of non-decomposable material are mixed in step (a).

12. The process of claim 10 in which said mixture containing the metal is heated to about 500°C to 1,100°C, and simultaneously pressed at about 1,000 to 10,000 pounds per square inch.

13. The process of claim 10 wherein said decomposable ceramic-forming compound is aluminum hydroxide.

14. The process of claim 10 wherein said metal is selected from the group consisting of copper, iron, nickel, titanium, steel, and nickel and chrome alloys.

15. The process of claim 10 wherein the metal is an interconnected structure.

16. The process of claim 10 wherein the mixture is heated to a temperature of about 1,200°C to form a product having a continuous ceramic matrix and a density greater than 3.78.

17. The process of claim 1 wherein said dopant is a fluorine-containing inorganic compound selected from the group consisting of LiF, $MgF_2$, HF, $AlF_3$ and $CrF_3$.

18. The process of claim 1 wherein the dopant is a metal oxide selected from the group consisting of CoO, $CrO_3$, $Cr_2O_3$, CuO, $MO_3$, MnO, $Nb_2O_5$, NiO, $TiO_2$, $WO_3$, $Y_2O_3$ and $ZrO_2$.

19. A process for the preparation of a magnesia ceramic product having a continuous ceramic matrix, and a density greater than 3.40, 3,40, comprising:
  a. mixing, by weight, (i) about 80 to 99.99 percent of $Mg(OH)_2$; (ii) about 0.5 to 5 percent of at least one dopant selected from the group consisting of fluorine-containing inorganic compounds and metal oxides; and (iii) about 0 to 15 percent of a non-metallic, non-decomposable filler material which is nondecomposable at temperatures of about 860°C;
  b. heating said mixture to 860°C to decompose said $Mg(OH)_2$; and
  c. pressing said mixture at 3,000 psi during decomposition of the $MgOH_2$ to shape, strengthen and densify said mixture, and produce a product having a continuous ceramic matrix and a density greater than 3.40 after cooling.

20. A process for the preparation of a magnesia ceramic product having a continuous ceramic matrix, and a density greater than 3.40, comprising:
  a. mixing, by weight (i) 80 to 99.99 percent of $Mg(OH)_2$; (ii) about 0.5 to 5 percent of at least one dopant selected from the group consisting of fluorine-containing inorganic compounds and metal oxides; and (iii) about 0 to 15 percent of a non-metallic, non-decomposable filler material which is non-decomposable at temperatures of 1,100°C;
  b. heating said mixture to 1,100°C to decompose said $Mg(OH)_2$; and
  c. pressing said mixture at 4,000 psi during decomposition of the $MgOH_2$ to shape, strengthen and densify said mixture, and produce a product having a continuous ceramic matrix, and a density greater than 3.40 after cooling.

21. A process for the preparation of a magnesia ceramic product having a continuous ceramic matrix, and a density greater than 3.40, comprising:
  a. mixing, by weight, 80 to 99.99 percent of $Mg(OH)_2$; about 0.5 to 5 percent of at least one dopant selected from the group consisting of fluorine-containing inorganic compounds and metal oxides and about 0 to 15 percent of a non-metallic, non-decomposable filler material which is non-decomposable at temperatures of 960°C;
  b. heating said mixture to 960°C to decompose said $Mg(OH)_2$; and
  c. pressing said mixture at 3,000 psi during decomposition of the $MgOH_2$ to shape, strengthen and densify said mixture, and produce a product having a continuous ceramic matrix, and a density greater than 3.40 after cooling.

22. A process for the preparation of a magnesia ceramic product having a continuous ceramic matrix, and a density greater than 3.40, comprising:
  a. mixing, by weight, 80 to 99.99 percent of $Mg(OH)_2$; about 0.5 to 5 percent of at least one dopant selected from the group consisting of fluorine-containing inorganic compounds and metal oxides; and about 0 to 15 percent of a non-metallic non-decomposable filler material which is non-decomposable at temperatures of 910°C;
  b. heating said mixture to 910°C to decompose said $Mg(OH)_2$; and
  c. pressing said mixture at 3,000 psi during decomposition of the $MgOH_2$ to shape, strengthen and densify said mixture, and produce a product having a continuous ceramic matrix and a density greater than 3.40 after cooling.

23. The process of claim 19, including the step of implanting 50 parts by volume of a metal into more than 50 parts by volume of said mixture, prior to the steps of heating and pressing said mixture.

24. The process of claim 20, including the step of implanting 50 parts by volume of a metal into more than 50 parts by volume of said mixture, prior to the steps of heating and pressing said mixture.

25. The process of claim 21, including the step of implanting 50 parts by volume of a metal into more than 50 parts by volume of said mixture, prior to the steps of heating and pressing said mixture.

26. The process of claim 22, including the step of implanting 50 parts by volume of a metal into more than 50 parts by volume of said mixture, prior to the steps of heating and pressing said mixture.

* * * * *